Patented May 16, 1950

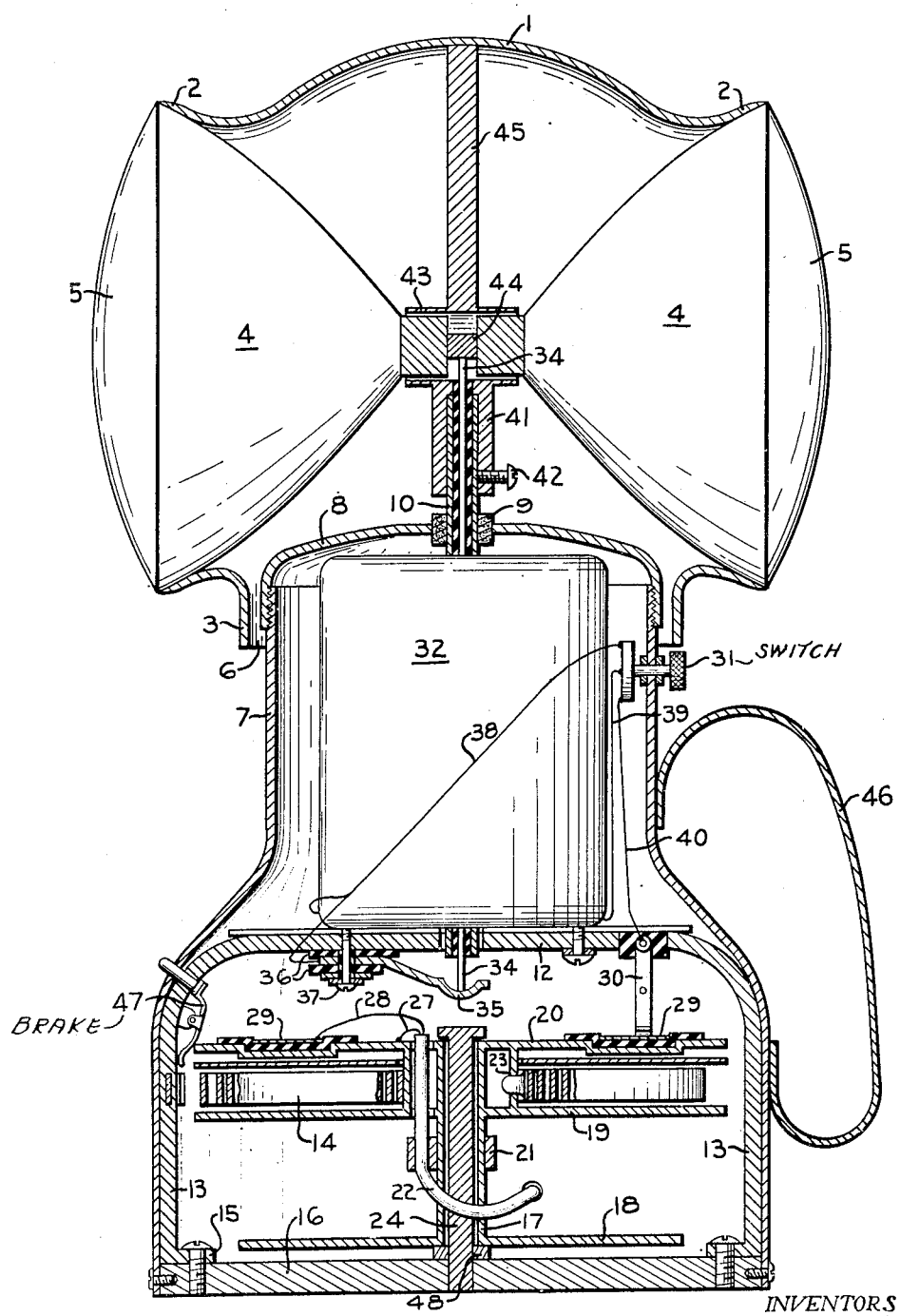

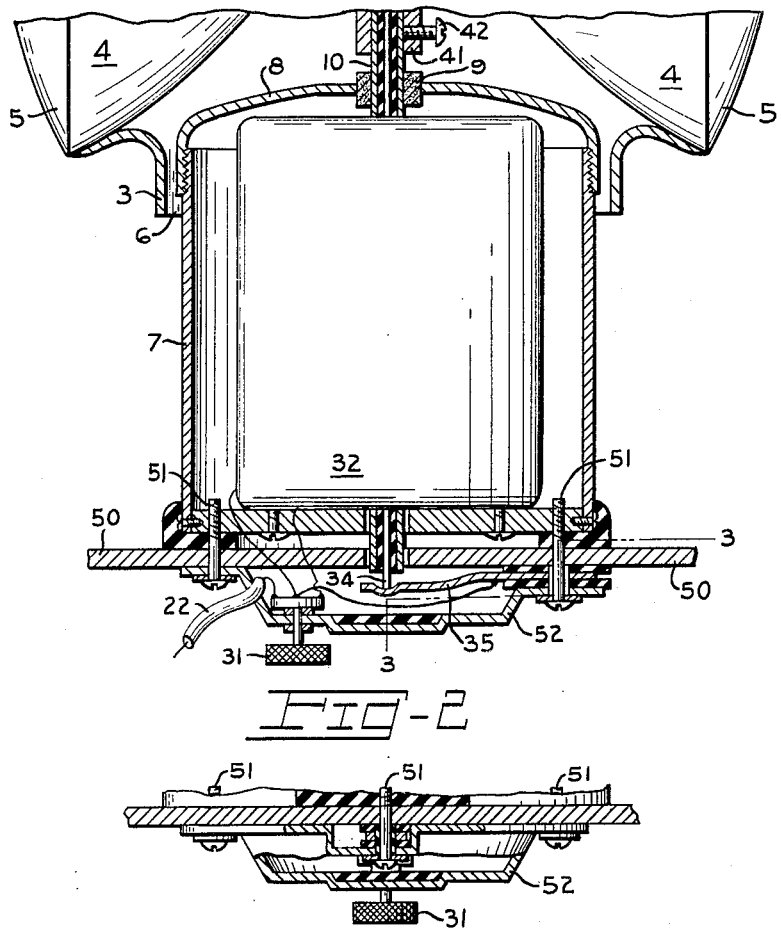
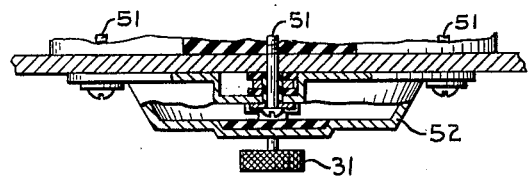
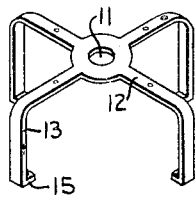

2,508,071

UNITED STATES PATENT OFFICE 2,508,071

SAFETY SIGNAL LAMP FOR MOTOR VEHICLES

Lawrence B. Martin, Wausau, Wis., and Harold W. Eberle and George H. Fengel, Davenport, Iowa; said Martin assignor to said Eberle and said Fengel Application September 3, 1946, Serial No. 694,670

2 Claims. (Cl. 177—329)

Our present invention relates to signal lamps for motor vehicles and more especially to one which can be used in conjunction with kerosene and gas flares which have been heretofore used as a warning signal when it has been necessary to stop alongside a road because of trouble. Among the objects of this invention are the provision of a signal lamp for the purpose indicated which will attract more attention than a plain oil flare, as commonly used; the provision of a signal lamp for the purpose indicated which can be electrically operated from the battery of a motor vehicle; the provision of a lamp for the purpose indicated which can be set on the ground at the side of or to the rear of a stalled vehicle and will be sufficiently conspicuous to attract such attention that vehicle collisions will be practically eliminated; to provide a signal lamp of the type indicated which can be held out at the side of a truck by a driver thereof to attract the attention of drivers of on-coming vehicles so that they will be adequately warned of possible danger; the provision of a lamp of the type indicated which can be used as a trouble lamp, as well as a danger signal lamp; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, and a modified form thereof, we desire the same to be understood as illustrative only and not to be interpreted in a limiting sense.

In the drawings annexed hereto and forming a part hereof,

Fig. 1 represents a longitudinal section through a signal lamp in accordance with our invention;

Fig. 2 represents a longitudinal section of a modified form of this lamp;

Fig. 3 represents a fragmentary section taken substantially along the plane indicated by the line 3—3, Fig. 2; and Fig. 4 is a perspective view of a supporting cage for the driving motor which causes rotation of the lamp head.

Reference will now be made in greater detail to the annexed drawings for a more complete description of this invention and, first of all, to the structure shown in Fig. 1. The head 1 of this signal is substantially a ball or hollow sphere with three holes formed therein and the edges of the holes flared outwardly to form flanges, as shown at 2 and 3. The flanges 2 form receptacles for the reflectors 4 in which are mounted electric lights of ordinary construction, not shown in the present drawings. The reflectors 4 have lenses 5 of ordinary construction which need not be shown in detail. The opening 6 within the flange 3 is designed to receive the upper end of the body casing 7 having the cap 8 screw-threadedly connected to its upper end. The form of the casing 1 is such as to reduce to a minimum the air-resistance encountered when driving rapidly and during severe storms.

In the center of cap 8 is formed an opening in which is mounted a dust, dirt, and moisture seal 9 through which passes a tube 10. The lower end of this tube passes through the hole 11 of the supporting frame 12, the arms 13 of which fit the inside of the casing 7. The lower ends of these arms are turned inwardly, as shown at 15, and have screws passed therethrough into the base 16, as is clear from Fig. 1. Within the base housing or casing 7 and above the base 16 is a spool comprising the hollow post 17 and the three heads 18, 19, and 20. A bracket 21 is clamped around the post 17 and engages the electric cord 22 to hold the same definitely positioned with relation to the heads 19 and 20. A spacing sleeve 23 is located between the heads 19 and 20 and surrounds the post 17 to form a core on which an actuating spring 14 may be wound. This sleeve is spaced sufficiently from the post 17 to leave enough room for the cable 22 to pass up through the sleeve.

A rigid post 24 is rigidly secured to the base 16 and serves to position the hollow post 17 about which the cable 22 is wound by the flat helical spring 14 coiled about the sleeve 23, between the heads 19 and 20. One end of this spring is attached to the sleeve 23 and the other to the frame 12, thus providing a spring motor for rotating the reel formed by the post 17 and the heads 18, 19, and 20. One wire 27 of the cable 22 is attached to the reel, forming part of the ground of the electric light and motor circuit of the apparatus, while the second wire 28 is connected to the ring contact member 29. The motor 32 is an ordinary shunt wound motor. A contact 30 supported by the frame 12 rides on the ring 29 as the latter rotates, keeping the circuit energized all the time that the switch 31 is closed, the contact being insulated from the frame 12. There is a rheostat connected with the switch 31, this being in the motor circuit and is used to control the speed of rotation of the motor. The light circuit has full power thereon whenever the switch 31 is closed. The switch 31 is constructed and arranged to energize first the electric lamps and then the motor, the former being in the reflectors 4 and the latter shown at 32. The hollow shaft or tube 10 forms the axis of the armature of the motor 32. A conductor 34 passes longitudinally through the shaft 10 and is insulated therefrom, projecting at its lower end into contact with the contact element 35. As shown at 36, this is insulated from the frame 12 but is secured thereto and to the motor frame by the bolt 37. Connected to the contact 35 is a lead 38 which is connected to one of the contact points of the switch 31. Connected to another one of the contact points of the switch 31 is a lead 39 which leads to the motor 32. A third lead 40 is connected to the switch 31 and the wiping contact element 30 to complete the circuit. The hollow shaft or tube 10 turns freely in the seal 9 and is connected through the sleeve 41 and set screw 42 to the lamp sockets 43 which are preferably integral with the sleeve 41. The conductor 34 engages the contact 44 which, in turn, engages the center contacts of the electric lamps in the reflectors 4. The shells of these lamps are grounded to the sockets 43, and these, through the support 45, are connected to the sleeve 41, the motor bearings, body 7, frame 12, and post 24.

The body of the signal lamp is provided with a handle 46 by means of which it may be readily handled when necessary. Also, a brake 47 is provided for holding the cable reel immovable when the cable has been pulled out and for releasing the reel when it is desired that the cable be again wound up. This brake is spring-actuated into holding position and may be moved into a releasing position by means of a button projecting from the outside of the case. A suitable supporting means 48 keeps the head 18 of the reel from resting on the bottom of the case and thus causing extra work in winding up and unwinding the cable. The cable winding spring on the reel is supported sufficiently above the bottom of the signal that it will not be immersed in event a little water should inadvertently get into the casing.

From the foregoing, it will be apparent that the end of the cable 22 may be detachably connected to the battery circuit and the signal lamp may be carried in the motor vehicle in a more or less accessible position, ready to be used at an instant's notice. It will also be realized that this is, in the form shown in Fig. 1, intended to be used interchangeably as a trouble lamp and in conjunction with a flare, and also as a warning between the time an emergency arises and flares are put out. The switch 31 is of a type that will permit the lights to be turned on without the motor being started or, by moving the switch a little farther, both the lights and the motor will be put into operation, thus giving the effect of a flash signal, due to the rotation of the head, even though the lights are on all the time. However, unlike a flash signal, it emits a traveling beam which will attract attention to a greater extent than a stationary light or a light traveling straight ahead. The revolving beam also gives to an on-coming motorist an idea of distance.

The structure shown in Figs. 2 and 3 is intended to be mounted on top of an automobile or truck, rather than being placed on the ground and, therefore, it is modified in certain details. For example, the cable-winding reel and the spring reel are unnecessary and are therefore not shown in Fig. 2. Since, in this construction, the base is entirely omitted, it is clear that the supporting frame 12, ring contact member 29, and wiping contact 30 are likewise omitted. In this construction, the signal is mounted on the deck 50 of the motor vehicle and is secured in place thereon by the bolts 51 which pass through a metal housing 52 below the deck to prevent contact with and injury to the contact 35. Since the signal is attached to the vehicle and remains in place all the time, it is not necessary that it be as portable as a signal which has to be moved from place to place, which is the case with the signal shown in Fig. 1. With this construction, as with that previously described, the tube 10, being the motor shaft, must rotate with the rotor of the motor. However, since this is not to be used as a trouble lamp but remains more or less permanently mounted on the deck of the vehicle, it is not necessary to have provision for turning on the lights independently of the motor.

It is of course understood that the specific description of structure set forth above may be departed from without departing from the spirit of this invention as disclosed in this specification and as defined in the appended claims.

Having now described our invention, we claim:

1. A safety lamp of the type indicated comprising a body having a rotatable head mounted thereon and rotating in a substantially horizontal plane, a motor below said head and substantially coaxial therewith, a plurality of lights carried by said head, projecting their light beams substantially horizontally in opposite directions, a switch in the electric circuit of said lights the shafts of said motor being directly connected to said head to cause rotation thereof, continuously, relatively to the body when the switch is closed, and means for supplying electric current to the motor and the electric lights, said head, when rotated, being adapted to intermittently show a beam of light forwardly and rearwardly of the vehicle when the rotor of the motor is rotating.

2. A signal lamp for the purpose stated comprising a generally ball-shaped hollow head having a pair of electric lamps mounted in reflectors in opposite sides of the head, supporting means for rotatably supporting said head with the axes of the lamps in a substantially horizontal direction when the lamps are in use, a casing extending into the bottom of the head, the casing and head being spaced sufficiently apart to permit unimpeded rotation of the head, an electric motor located in said casing, the rotor of the motor being connected to the head in driving relation to cause rotation thereof, electric conducting means for carrying electric current to the motor and the electric lamps for energization thereof, and a switch for controlling the flow of electric current to the motor and the lamps, said head being adapted to intermittently project a beam of light rearwardly of the vehicle with which the signal is used as the motor rotates the head.

LAWRENCE B. MARTIN.
HAROLD W. EBERLE.
GEORGE H. FENGEL.

REFERENCES CITED

The following references are of record in the file of this patent:

UNITED STATES PATENTS

| Number | Name | Date |
|---|---|---|
| 358,484 | Rogers | Mar. 1, 1887 |
| 1,713,052 | Page | May 14, 1929 |
| 1,772,499 | Rumsey | Aug. 12, 1930 |
| 2,035,841 | Signor | Mar. 31, 1936 |